United States Patent
Pink et al.

(10) Patent No.: US 11,624,446 B1
(45) Date of Patent: Apr. 11, 2023

(54) VESSEL VALVE WITH PURGE FEATURE

(71) Applicant: Dynamic Ratings, Inc., Sussex, WI (US)

(72) Inventors: Tony R. Pink, Hartland, WI (US);
Jeffrey S. Mann, Milwaukee, WI (US)

(73) Assignee: Dynamic Ratings, Inc., Sussex, WI (US)

( * ) Notice: Subject to any disclaimer, the term of this patent is extended or adjusted under 35 U.S.C. 154(b) by 0 days.

(21) Appl. No.: 17/971,132

(22) Filed: Oct. 21, 2022

Related U.S. Application Data

(60) Provisional application No. 63/327,483, filed on Apr. 5, 2022.

(51) Int. Cl.
*F16K 5/02* (2006.01)
*F01L 7/04* (2006.01)

(52) U.S. Cl.
CPC .............. *F16K 5/0264* (2013.01); *F01L 7/04* (2013.01); *B65D 2205/00* (2013.01)

(58) Field of Classification Search
CPC ........ F16K 5/0264; F16K 5/0421; F01L 7/04; B65D 2205/00; B65D 2205/02
See application file for complete search history.

(56) References Cited

U.S. PATENT DOCUMENTS

| | | | | |
|---|---|---|---|---|
| 5,808,189 | A * | 9/1998 | Toyoda | G01L 27/007 73/114.37 |
| 10,012,179 | B2 * | 7/2018 | Miyabe | F02M 25/0854 |
| 11,333,095 | B1 * | 5/2022 | Dudar | F02D 41/004 |

* cited by examiner

*Primary Examiner* — Syed O Hasan
(74) *Attorney, Agent, or Firm* — Boyle Fredrickson, S.C.

(57) ABSTRACT

A valve used in combination with a vessel containing fluid in the interior and a parameter measuring device. The valve allows the device to be exposed to the fluid in the interior of the vessel. The device may be installed into the valve, and the valve may be fitted to the side of the vessel. The valve improves upon other prior art by providing provisions for purging air trapped in the internal cavity of the valve. The valve includes a purge position, which provides a smaller opening from the interior of the vessel to the internal cavity and an air path to the external atmosphere. Fluid may fill the valve pushing trapped air out of the valve until the majority of the trapped air is expelled.

19 Claims, 13 Drawing Sheets

VESSEL VALVE WITH PURGE FEATURE

BACKGROUND OF THE INVENTION

1. Field of the Invention

The invention relates to a valve that is typically fixed to a wall of a vessel, which contains a volume of fluid. Generally, the valve may enable a device, such as a sensor, to be positioned into fluid communication with the fluid contained within the vessel interior.

2. Discussion of the Related Art

Such a valve as described above is disclosed in U.S. Pat. No. 7,267,322, the entire contents of which are hereby incorporated by reference. Generally, the valve in the '322 patent includes a hollow inner sleeve that is inserted into the internal cavity of a hollow outer sleeve. The outer sleeve may be fitted to the wall of a vessel, such that at least part of the outer sleeve and inner sleeve extend to the interior of the vessel, which contains a fluid. A device, such as a sensor may be inserted into the internal cavity of the inner sleeve. Both the outer sleeve and the inner sleeve contain openings through the respective sleeves from the exterior surface to the internal cavity. When the openings are properly aligned, the fluid contained in the interior of the vessel may be placed in fluid communication with the internal cavity of the inner sleeve, thus, exposing the device to the fluid in the interior of the vessel.

Typically, the outer sleeve has a cylindrical shape and includes at least one sidewall, herein the outer sidewall, that creates a hollow internal cavity. The outer sleeve includes one or more holes that extend through the entirety of the outer sidewall, creating an opening from the exterior of the outer sidewall to the internal cavity. The outer sleeve may be fixed to a wall of a vessel, which contains fluid in the interior. The outer sidewall may extend into the interior of the vessel, such that the fluid contained in the interior of the vessel may be in fluid communication with the internal cavity of the outer sleeve.

Similarly, the inner sleeve may have a cylindrical shape and include at least one sidewall, herein the inner sidewall, that creates a hollow internal cavity. Additionally, the inner sleeve includes one or more holes that extend through the entirety of the inner sidewall, creating an opening from the exterior of the inner sidewall to the internal cavity of the inner sleeve. The inner sleeve may be inserted into the internal cavity of the outer sleeve. The inner sleeve and the outer sleeve are sized such that the outer surface of the inner sidewall is in close proximity to or in contact with the inner surface of the outer sidewall.

The inner sleeve rotates relative to the outer sleeve. This rotation changes the open and closed positioning of the valve as the holes or openings in each sleeve go from being aligned to not aligned. The valve is in the open position when the inner sleeve is rotated so that the inner openings in the inner sleeve are aligned with the outer openings in the outer sleeve. In the open position, the fluid in the interior of the vessel is in fluid communication with the internal cavity of the inner sleeve through the outer and inner openings. Alternatively, the valve is in the closed position when the inner sleeve is rotated so that the inner openings in the inner sleeve are not aligned with the outer openings in the outer sleeve. In the closed position, fluid communication between the interior of the vessel and the internal cavity of the inner sleeve is cut off. A stop arrangement is provided between the outer sleeve and the inner sleeve for positioning the valve in either a fully open or a fully closed position.

A device, such as a sensor, may be installed in the internal cavity of the inner sleeve. This device is secured in a way so that the internal cavity of the inner sleeve is sealed from the exterior air, e.g. via mating threads. When the valve is in the open position, the device is exposed to the fluid in the interior of the vessel through the aligned openings in the outer and inner sleeves. When the valve is rotated to the closed position, this exposure ends.

When a device is replaced, the valve is placed in the closed position as the old device is removed and the new device is inserted. The valve is closed to prevent liquid from the interior of the vessel from being expelled from the valve. A new device is inserted into the internal cavity of the inner sleeve, and the valve may then be turned to the open position.

However, prior to sealing the inner sleeve with a new device, the internal cavity in the inner sleeve is exposed to the atmosphere. When a device is inserted into the inner sleeve, a volume of air is trapped within the internal cavity of the inner sleeve. After the valve is rotated to the open position, the trapped volume of air is introduced to the interior of the vessel. The air leaves the internal cavity of the inner sleeve, travels through the openings in the inner and outer sleeves, and circulates through the fluid in the vessel. If the fluid in the vessel is a liquid, the air will rise to the top of the liquid and the vessel. This can have a deleterious effect on the vessel and/or its operation.

SUMMARY AND OBJECTS OF THE INVENTION

The disclosed invention addresses the above-identified issues and improves upon the prior art by including provisions to ensure air is not introduced to the interior of a vessel. This may be accomplished by providing a means to purge the trapped volume of air prior to rotating the valve from the closed to open position.

The valve may include an inner sleeve and an outer sleeve. Both sleeves may have a generally hollow cylindrical shape with at least one sidewall forming an internal cavity in each sleeve. The outer sleeve may include an end wall at one end of the outer sidewall. Additionally, both sleeves may have one or more openings, such that the internal cavity of each sleeve is in fluid communication with the exterior of each sleeve.

Generally, the valve may be used with a vessel, which contains a fluid in the vessel's interior. The outer sleeve may be fixed to a wall of the vessel and extend into the interior of the vessel. The inner sleeve may be inserted into the internal cavity of the outer sleeve. To fit, the inner sleeve may have dimensions such that the outer surface of the inner sleeve is marginally smaller than the inner surface of the internal cavity of the outer sleeve. The outer surface of the inner sleeve may be positioned in close proximity to or in contact with the inner surface of the outer sleeve. A device, such as a sensor, may then be inserted into the internal cavity of the inner sleeve. The device may be connected to the inner sleeve such that the inner sleeve's internal cavity is sealed from the external atmosphere, for example via mating threads.

The inner sleeve may be able to rotate relative to the outer sleeve. This rotation may change the valve's positioning between the open and closed positions. In the open position, the inner sleeve may be rotated such that the openings in the inner sleeve are aligned with the openings in the outer sleeve. The exterior of the outer sleeve may be in fluid communication with the internal cavity of the inner sleeve through the aligned openings. A device installed in the inner sleeve may be exposed to the fluid in the interior of the vessel. Alternatively, in the closed position, the inner sleeve may be rotated so that the openings in the inner and outer sleeves are not aligned. Fluid communication between the exterior of the outer sleeve and the internal cavity of the inner sleeve is cut off, and the device is not exposed to the fluid in the interior of the vessel.

The valve may include a stopper assembly to position the valve in the fully open and fully closed positions. The inner sleeve may include a body opposite the end of the inner sleeve that may be inserted in the outer sleeve. The stopper assembly may involve the body of the inner sleeve having a traverse passage forming a hole from the external surface to the internal surface of the inner sleeve. The traverse passage may include mating threads to accept a threaded screw. A screw with a seal near or on the bottom of the screw head may mate with the traverse passage on the exterior of the inner sleeve. The outer sleeve may include a collar with an elongated slot positioned such that the screw mated with the traverse passage protrudes from the slot. Moving the screw along the slot may cause the inner sleeve to rotate and the valve to change positions between open and closed. Moving the screw to either end of the slot may rotate the inner sleeve to the fully open or fully closed position.

Unlike the disadvantages of the prior art, the valve of the present invention includes provisions for purging any air trapped in the internal cavity of the inner sleeve. First, at least one opening in the inner sleeve may at least partially align with an opening in the outer sleeve, herein the purge opening. This partial alignment may be the result of an opening having an irregular shape, such as an elongated circle. While this purge opening may be partially aligned, the other openings in the inner sleeve remain out of alignment with openings in the outer sleeve. This may occur when the screw is moved between the fully open and fully closed positions in the slot of the outer sleeve. This partial alignment provides fluid communication between the fluid in the vessel interior and the internal cavity of the inner sleeve through the purge opening alone.

Additionally, the inner sleeve may include a slot in the sidewall. The slot may provide a channel leading from the sidewall to the traverse passage. The slot and channel may provide an air path from the internal cavity of the inner sleeve to the traverse passage. Thus, the fluid in the interior of the vessel may be in fluid communication with the traverse passage through the partial alignment of the purge opening and the air path. When the screw is loosened, this air path may continue to the exterior of the valve and vessel. If the screw is tightened, the screw seal may block the air path from continuing to the exterior atmosphere.

The air path may provide the valve a means to purge any air trapped in the internal cavity of the inner sleeve. The screw may be moved to the purge position causing the purge opening to be partially aligned. Generally, the purge position corresponds to the screw being positioned near the middle of the slot in the collar of the outer sleeve. The purge opening in the inner sleeve may be positioned facing at least partially downward. In the purge position, the screw may be loosened to unseal the traverse passage. Fluid in the interior of the vessel pushes through the partially aligned openings into the internal cavity of the inner sleeve. The fluid may then push the trapped air through the air path, expelling the trapped air to the exterior atmosphere through the traverse passage.

After all the trapped air is removed, liquid from the interior of the vessel may fill the air path and begin to be expelled through the traverse passage. Once a user believes as much trapped air as possible has been removed, the screw may be tightened to seal the traverse passage and block the air path. With the trapped air purged, the valve may then be moved to the fully open position with little to no air being introduced to the interior of the vessel.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE INVENTION

The present invention and the various features and advantageous details thereof are explained more fully with reference to the non-limiting embodiments described in detail in the following description.

Figure 1:
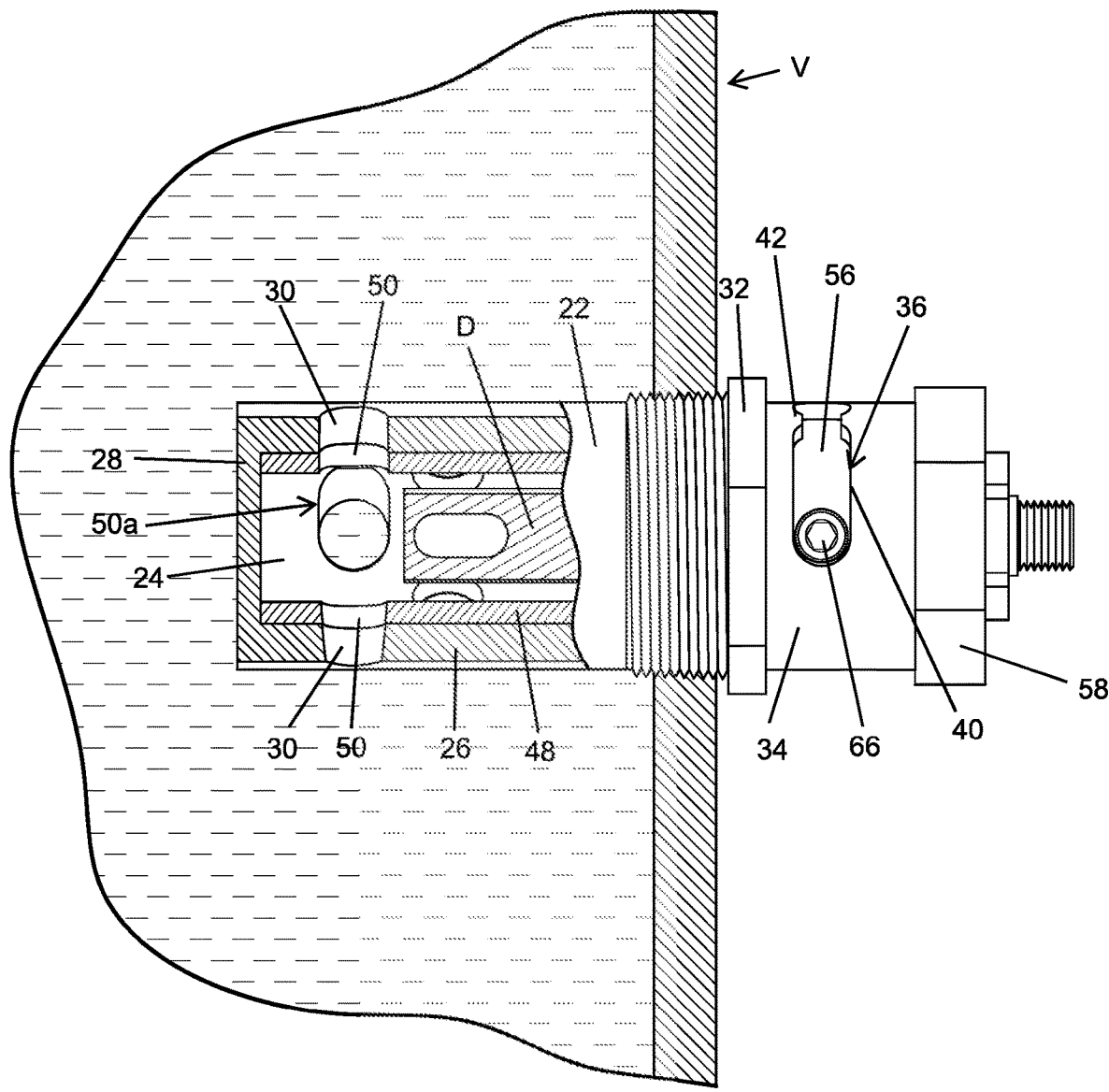
FIG. 1 is an elevation view, partially in section, illustrating a valve in accordance with the present invention fitted to the side of a vessel containing fluid in the vessel interior.

FIG. 1 depicts a valve 20 mounted in a vessel V containing fluid in the vessel interior. The vessel V may be a closed container holding fluid in the interior. The fluid may be a liquid or a gas.

A need to measure properties of the fluid without disturbing the fluid or exposing the fluid to atmosphere may arise. For example, it may be beneficial to measure the temperature of the fluid while the fluid remains in the vessel. The valve 20 in the present invention may help obtain these property measurements.

Figure 2:
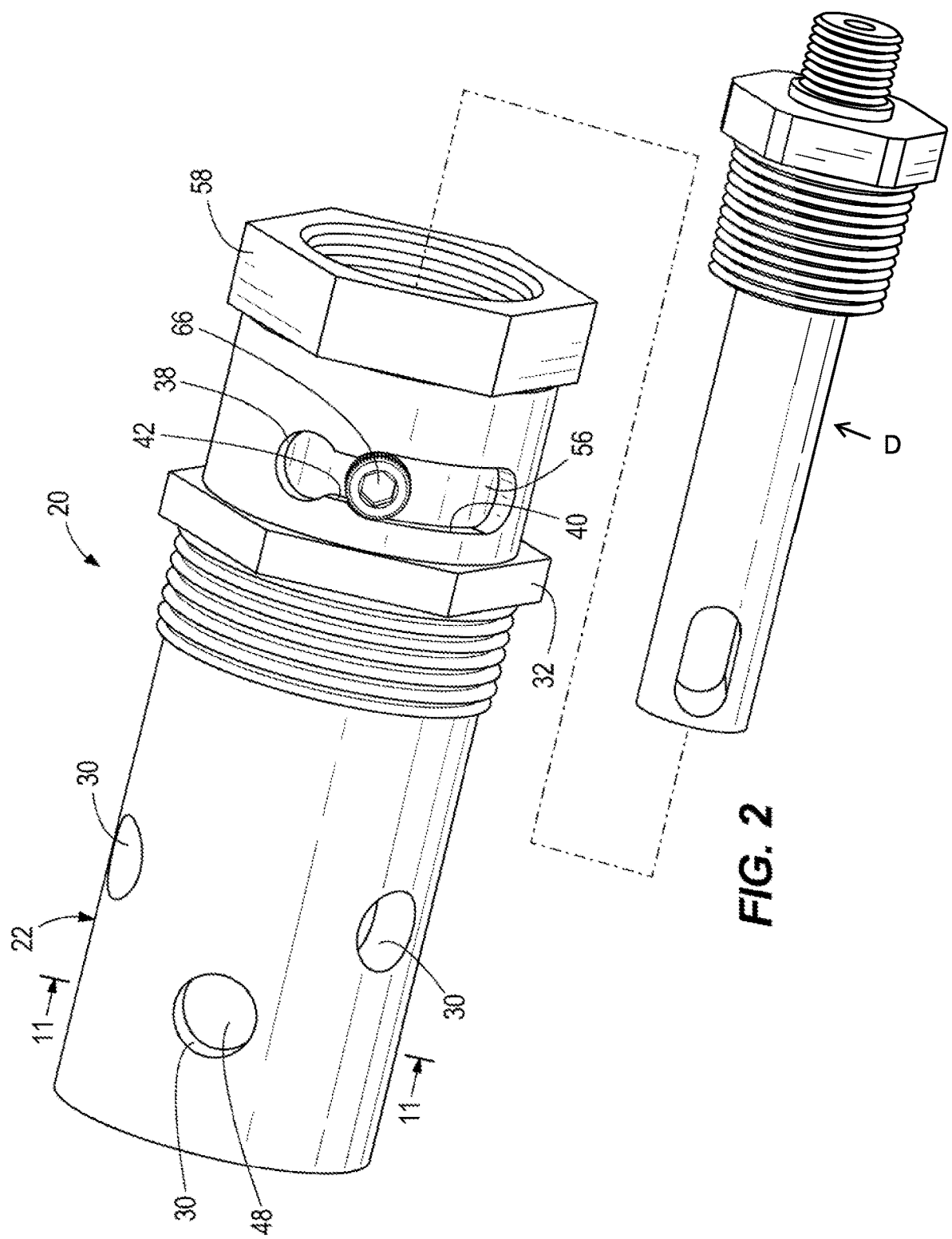
FIG. 2 is an isometric view of the valve of FIG. 1, showing a device that may be inserted into the inner sleeve of the valve.
Figure 3:
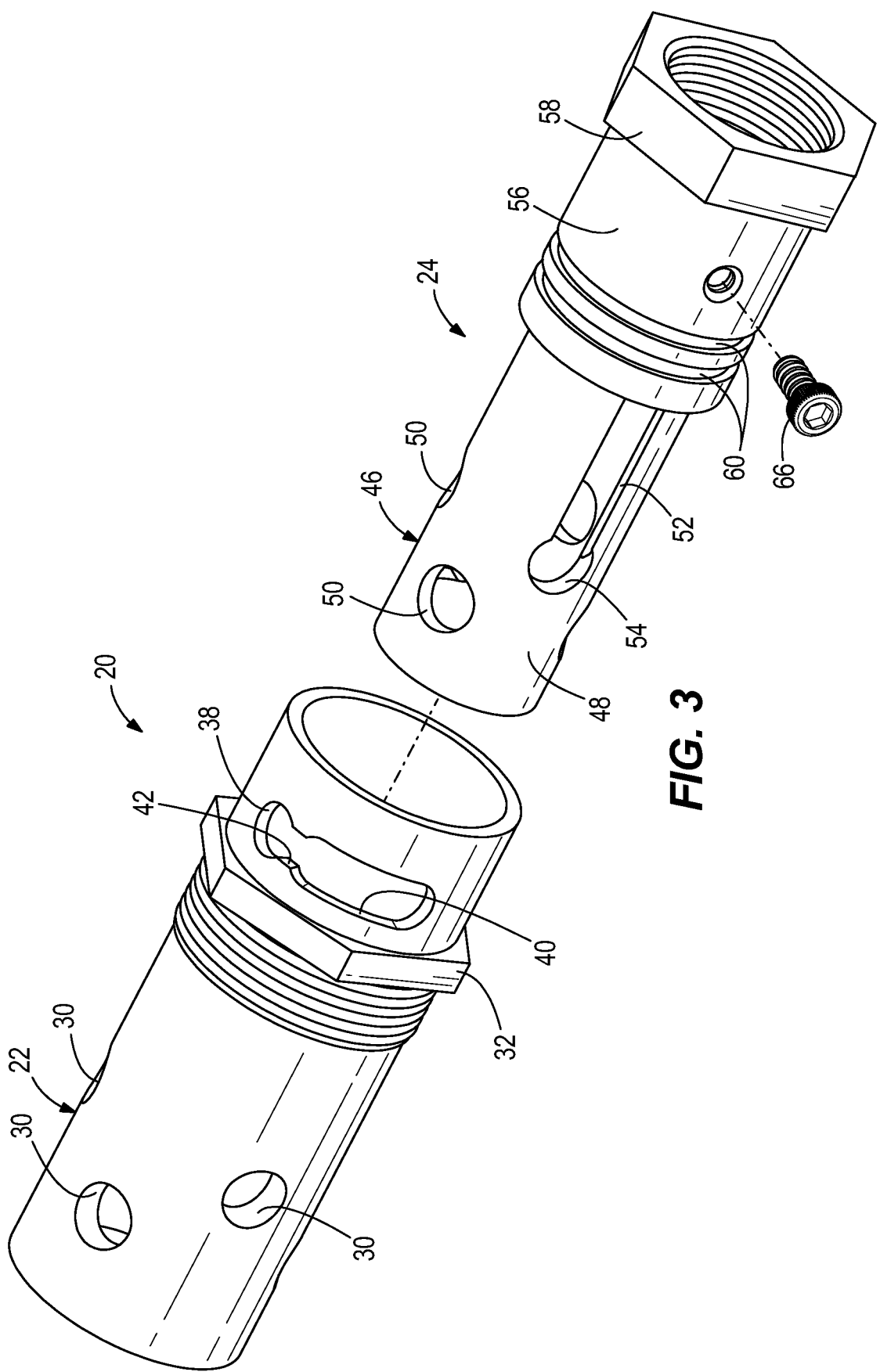
FIG. 3 is an exploded isometric view of the valve of FIGS. 1 and 2, showing an inner sleeve of the valve removed from an outer sleeve.

The valve 20 may include an outer sleeve 22, which may be fitted to the wall of the vessel V. Part of the outer sleeve 22 may extend into the interior of the vessel, and the other part may extend to the exterior of the vessel V. As illustrated in FIG. 3, an inner sleeve 24 may be inserted into the outer sleeve 22. Furthermore, as illustrated in FIG. 2, a device D, such as a sensor, may be inserted into the inner sleeve 24. By opening the valve 20, the device D may be exposed to the fluid on the interior of the vessel V.

Figure 7:
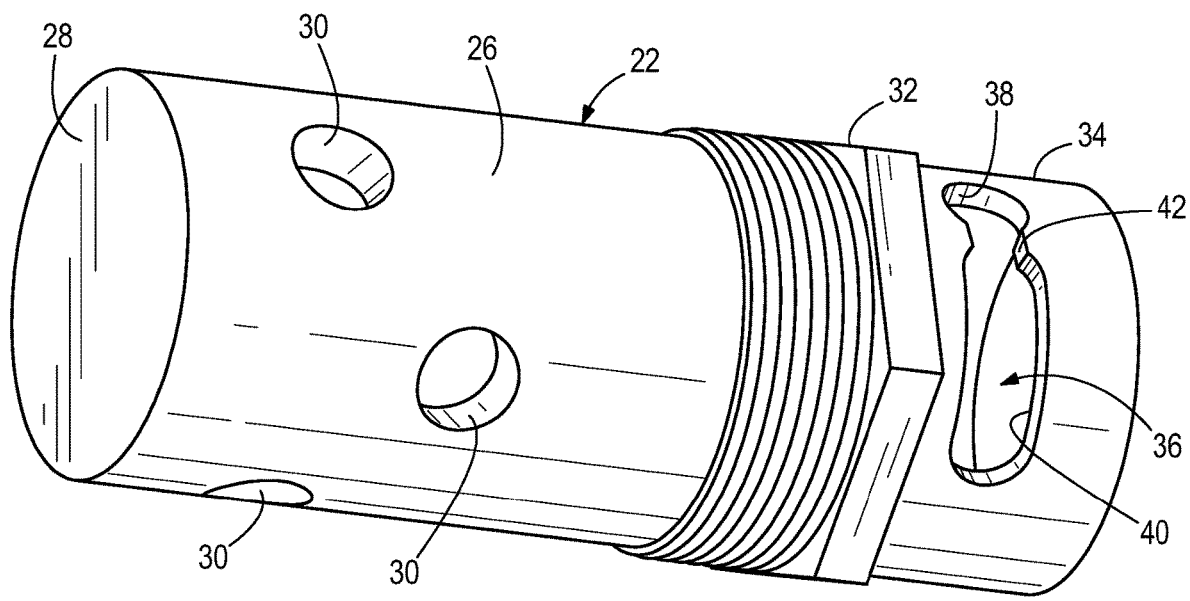
FIG. 7 is an isometric view of the outer sleeve of the valve of FIGS. 1-6.

As shown in FIG. 7, the outer sleeve 22 may have a generally cylindrical shape. The outer sleeve 22, may include at least one sidewall, herein an outer sidewall 26. The outer sidewall 26 may form a hollow internal cavity within the outer sleeve 22. Additionally, the outer sleeve 22 may include at least one end wall 28 connected to the edge of the outer sidewall 26 at one end of the outer sleeve 22.

The outer sleeve 22 may include one or more openings through the outer sidewall 26, herein outer openings 30. The outer openings 30 may span through the entire outer sidewall 26 thickness such that the exterior of the outer sleeve 22 may be in fluid communication with the internal cavity of the outer sleeve 22 through the outer openings 30. In other words, the outer openings 30 may be holes in the outer sidewall 26. Multiple outer openings 30 may be spread across the outer sidewall 26. As shown in FIG. 7, the outer openings 30 may be circular.

The outer sleeve 22 may include some means to be attached to the wall of the vessel V. Attaching the outer sleeve 22 to the vessel wall may allow the outer sidewall 26 and end wall 28 to extend into the interior of the vessel V with part of the outer sleeve 22 remaining on the exterior of the vessel V. As shown in FIG. 7, one embodiment may include threads on the external surface of the outer sleeve 22 to mate with a threaded hole in the vessel wall. A flange 32 may be included at one end of the threads. The flange 32 may be on the end of the threads that is opposite the end wall 28. The flange 32 may be used to help screw the threads of the outer sleeve 22 into the vessel wall. In one embodiment, the flange 32 may have a hex shape.

Additionally, the outer sleeve 22 may include a collar 34 extending from the flange 32, opposite the threads of the outer sleeve 22. The collar 34 may be an extension of the general cylindrical shape of the outer sleeve 22. The collar 34 may include a slot, herein the outer slot 36. The outer slot 36 may span the entire thickness of the collar 34 creating a hole from the exterior surface of the collar 34 to the internal cavity of the outer sleeve 22. The outer slot 36 may be elongated and extend perpendicularly to the length of the outer sleeve 22. At one end, the outer slot 36 may have a circular shape, herein the circular end 38. The circular end 38 may pinch together at one point creating a narrow neck 42. From the narrow neck 42, the outer slot 36 may extend via an elongated channel 40.

Figure 8:
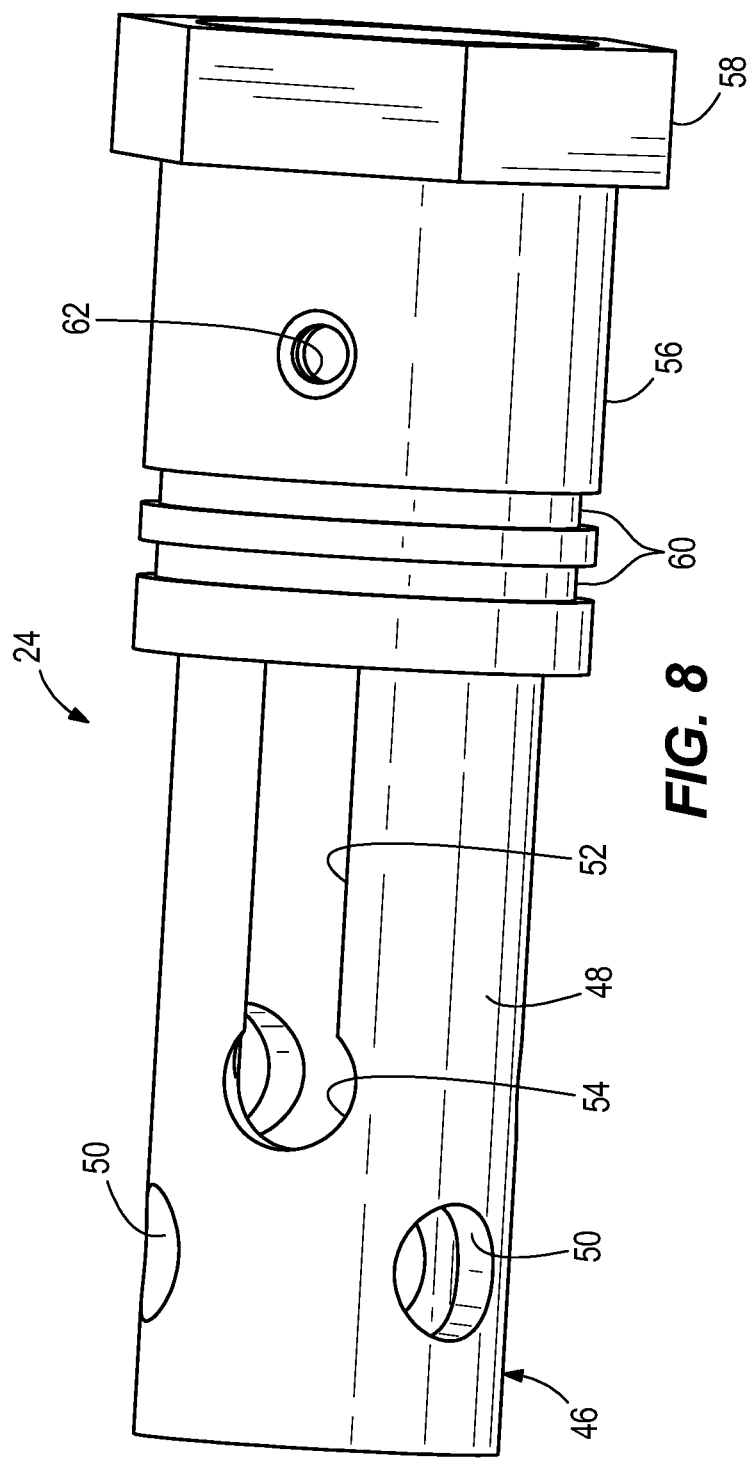
FIG. 8 is an isometric view of the inner sleeve of the valve of FIGS. 1-6.
Figure 9:
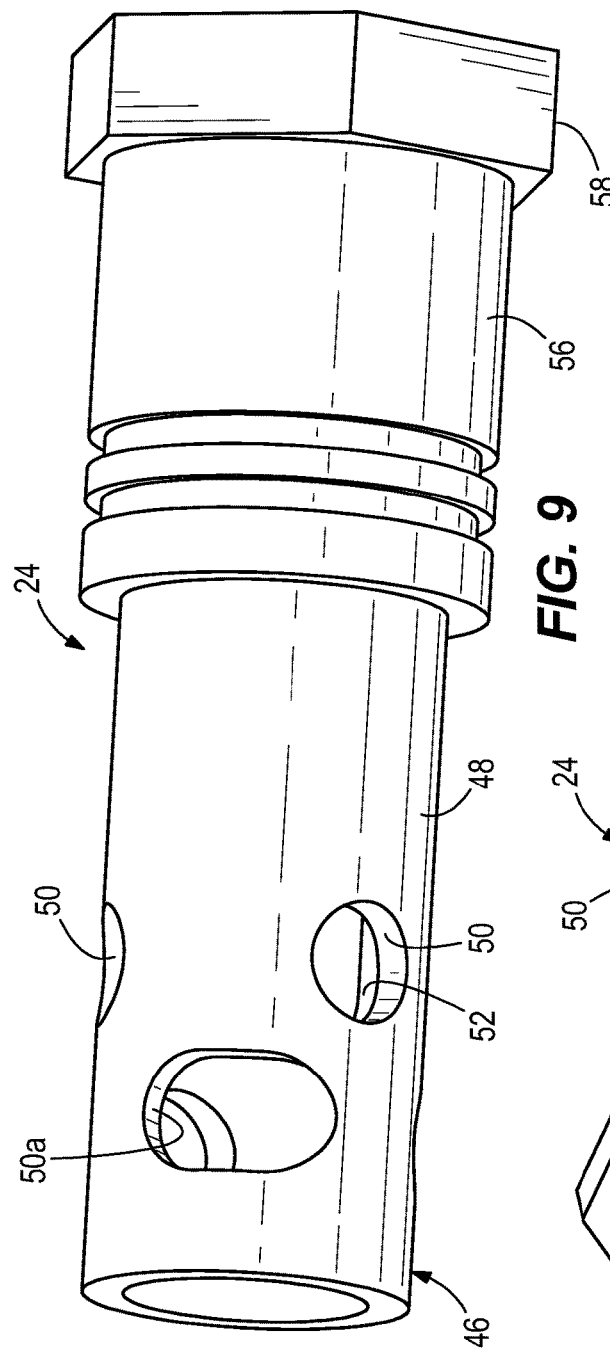
FIG. 9 is another isometric view of the inner sleeve of the valve of FIGS. 1-6.
Figure 10:
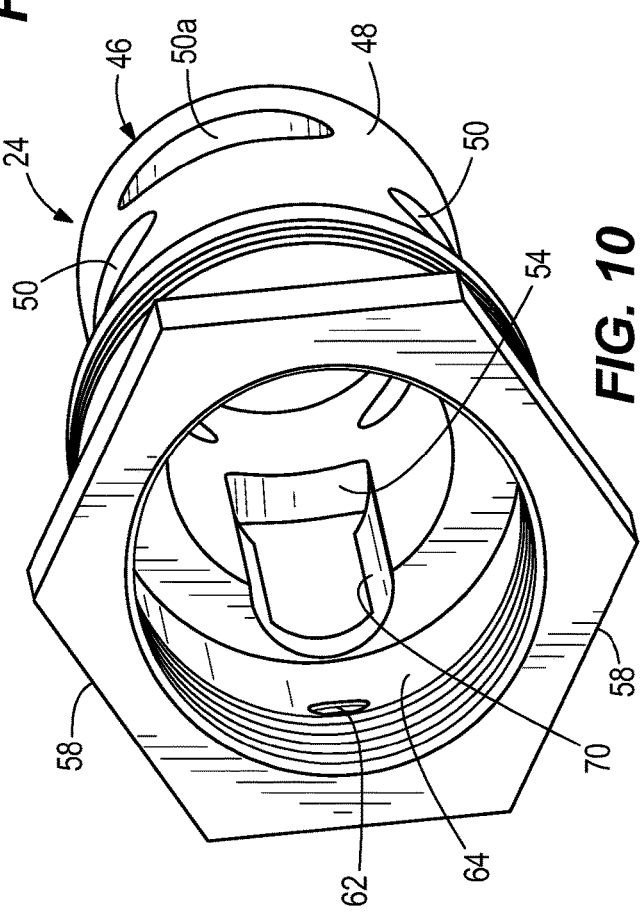
FIG. 10 is another isometric view of the inner sleeve of the valve of FIGS. 1-6, showing the internal cavity of the inner sleeve with a channel.

As shown in FIGS. 8-10, the valve 20 may also include an inner sleeve 24. Similar to the outer sleeve 22, the inner sleeve 24 may have a generally cylindrical shape. The inner sleeve 24 may include at least one sidewall, herein the inner sidewall 48. The inner sidewall 48, having a generally cylindrical shape, may form an inner barrel 46 with a hollow internal cavity.

The inner sleeve 24 may include a body portion extending from one end of the inner sidewall 48, herein the inner body 56. The inner body 56 may have a larger exterior perimeter than the inner sidewall 48 and be a continuation of the cylindrical shape of the inner sleeve 24. One embodiment may include grooves 60 in the inner body 56. O-rings or some other sealing means may be positioned in the grooves 60. A head, herein the inner head 58, may extend from the end of the inner body 56 that is opposite the inner sidewall 48. The inner head 58 may include some means for mating a device D that is inserted into the internal cavity of the inner sleeve 24. For example, the inner surface of the inner head 58 may include mating threads capable of accepting threads on a device. The inner head 58 may have a general hex shape.

Figure 4:
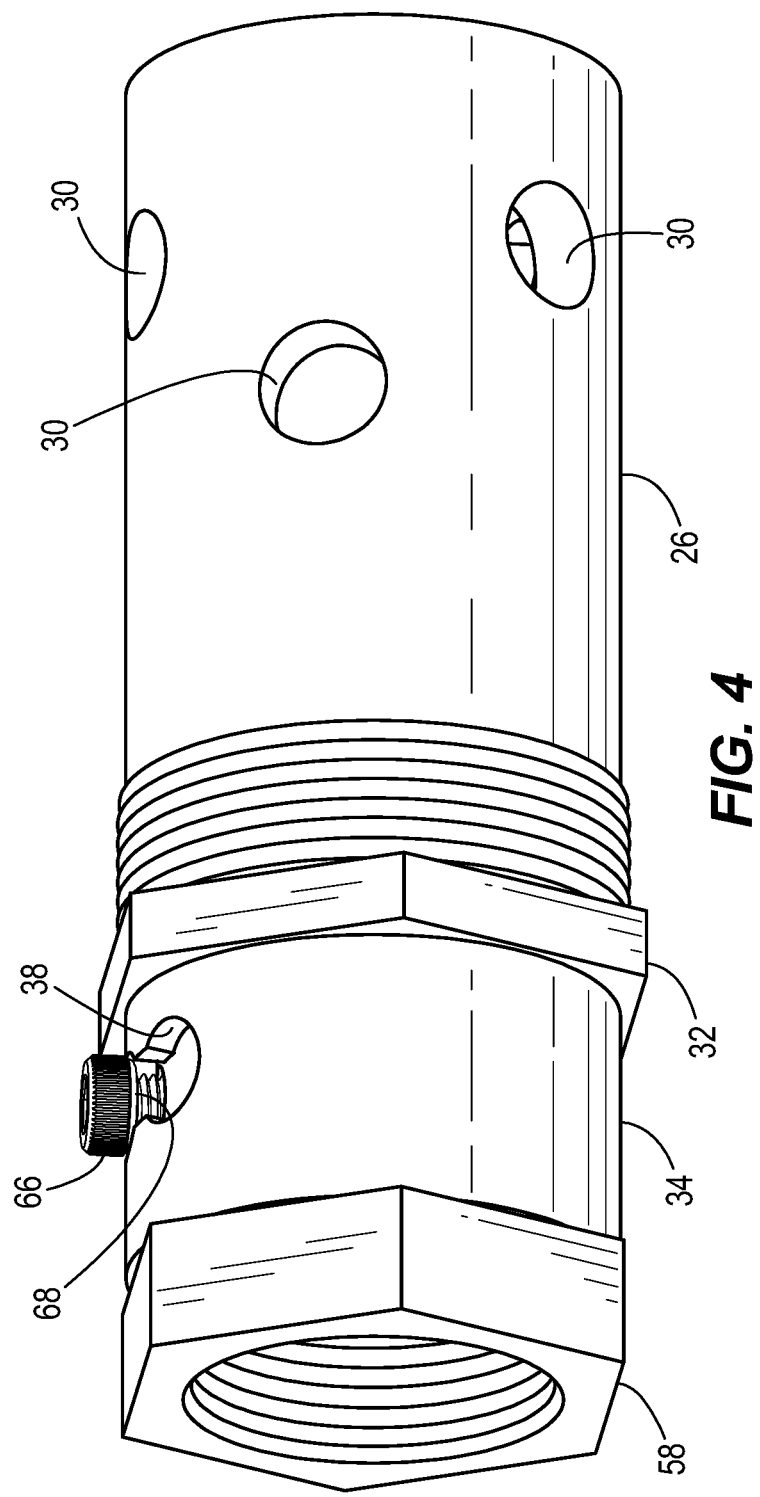
FIG. 4 is an isometric view of the assembled valve of FIGS. 1-3, with the inner sleeve inserted into the outer sleeve.

The dimensions of the inner sleeve 24 may be sized so that the inner sleeve 24 may be inserted into the internal cavity of the outer sleeve 22, as illustrated in FIG. 3. The exterior surface dimensions of the inner sidewall 48 may be marginally smaller than the interior surface dimensions of the outer sidewall 26. When the inner sleeve 24 is inserted in the outer sleeve 22, the exterior surface of the inner sidewall 48 may be in close proximity to or touching the surface of the internal cavity of the outer sidewall 26. Similarly, the exterior surface dimensions of the inner body 56 may be marginally smaller than the interior surface dimensions of the collar 34. When the inner sleeve 24 is inserted in the outer sleeve 22, the exterior surface of the inner body 56 may be in close proximity to or touching the surface of the internal cavity of the collar 34. In the case that O-rings or some other sealing means are positioned in the grooves 60 of the inner body 56, any gap between the inner sleeve 24 and the outer sleeve 22 may be sealed from the external atmosphere. An assembled valve 20 with an inner sleeve 24 inserted into an outer sleeve 22 is illustrated in FIG. 4.

As illustrated in FIG. 2, a device D may be inserted into the internal cavity of the inner sleeve 24. The device D may be a sensor to measure the parameters of the fluid in the interior of the vessel V. For example, the device D may be a temperature sensor used to measure the temperature of the fluid. The device D may include a means to attach to the inner head 58. In one embodiment, the device D may include threads that mate with internal threads in the inner head 58. The connection between the device D and the inner head 58 may seal the internal cavity of the inner sleeve 24 from the external atmosphere.

As shown in FIG. 8, the inner body 56 may include a traverse passage 62. The traverse passage 62 may be a hole that spans the entire thickness of the inner body 56, such that the exterior of the inner body 56 may be in fluid communication with the internal cavity of the inner sleeve 24 through the traverse passage 62. The traverse passage 62 may be a circular hole with threads capable of accepting a threaded component. A screw 66 may be inserted into the traverse passage 62. The screw 66 may include screw seal 68 on the underside of the head of the screw 66. When the screw 66 is tightened, the screw seal 68 may abut and press against the inner body 56. When tightened, the screw seal 68 may cut off fluid communication from the exterior of the inner body 56 to the internal cavity of the inner sleeve 24. While the inner sleeve 24 is inserted into the outer sleeve 22, the traverse passage 62 and the screw 66 may align with the outer slot 36 such that the screw 66 may protrude from the outer slot 36.

The inner sleeve 24 may also include one or more openings through the inner sidewall 48, herein inner openings 50. The inner openings 50 may span the entire thickness of the inner sidewall 48, such that the exterior of the inner sleeve 24 may be in fluid communication with the internal cavity of the inner sleeve 24 through the inner openings 50. In other words, the inner openings 50 may be holes in the inner sidewall 48. Multiple inner openings 50 may be positioned across the inner sidewall 48 so that when the inner sleeve 24 is inserted in the outer sleeve 22 and rotated properly, the inner openings 50 align with the outer openings 30.

The inner sidewall 48 may include at least one opening sized and positioned for the purge feature of the valve 20, herein the purge opening 50a. The purge opening 50a may be sized and positioned so that the purge opening 50a may at least partially align with an outer opening 30 when the other inner openings 50 are not aligned with outer openings 30. This may be accomplished by having an irregular shape or position for the purge opening 50a. As shown in FIG. 9, the purge opening 50a may have an oval or elongated circle shape.

Figure 6:
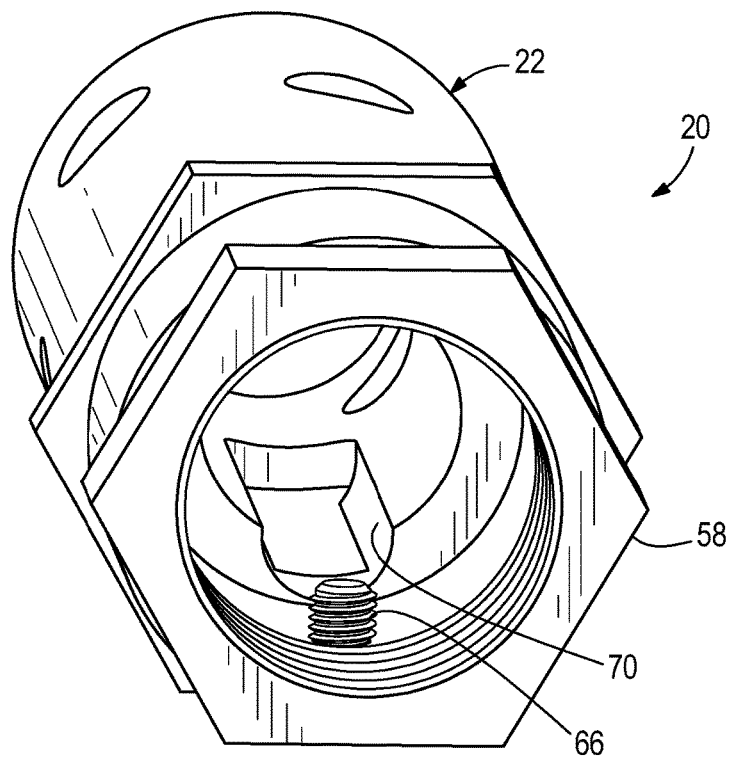
FIG. 6 is an isometric view of the valve of FIGS. 1-5, showing the internal cavity of the inner sleeve, while the inner sleeve is inserted into the outer sleeve.

Additionally, the inner sidewall 48 may include a slot, herein the inner slot 52. The inner slot 52 may run parallel with the length of the inner sidewall 48 and span the entire thickness of the inner sidewall 48, such that the exterior of the inner sidewall 48 may be in fluid communication with the internal cavity of the inner sleeve 24. In other words, the inner slot 52 may form an elongated hole in the inner sidewall 48. The end of the inner slot 52 opposite the traverse passage 62 may have an enlarged end 54. An elongated length of the inner slot 52 may then extend toward the traverse passage 62. As shown in FIGS. 6 and 10, the walls of the inner slot 52, made up of the thickness of the inner sidewall 48, form a channel, herein the inner channel 70. The inner channel 70 extends to the internal surface 64 of the inner body 56, where the traverse passage 62 is located. The inner slot 52 and the inner channel 70 may form an air path from the internal cavity of inner sleeve 24 to the traverse passage 62. When the screw 66 is loosened in the traverse passage 62, this air path may continue through the traverse passage 62 to the exterior atmosphere.

The valve 20 may function by rotating the inner sleeve 24 relative to the outer sleeve 22. When the inner sleeve 24 is inserted within the outer sleeve 22, the traverse passage 62 and screw 66 may be positioned within the outer slot 36. The inner sleeve 24 may be rotated relative to the outer sleeve 24 via moving the screw 66 along the outer slot 36. Rotating the inner sleeve 24 relative the outer sleeve 22 may change the alignment of the inner openings 50 compared to the outer openings 30.

Changing the alignment of the openings may change the valve 20 between the open to the closed positions. In the open position, the inner sleeve 24 may be rotated such that the inner openings 50 align with the outer openings 30. When the valve 20 is inserted in the vessel V, the fluid in the interior of the vessel V may be in fluid communication with the internal cavity of the inner sleeve 24 through the aligned outer openings 30 and inner openings 50. A device D inserted into the internal cavity of the inner sleeve 24 may then be exposed to the fluid in the interior of the vessel V. In this open position, the screw 66 may be moved to one end of the outer slot 36. In one embodiment, this end of the outer slot 36 may be the end of the elongated channel 40.

Alternatively, in the closed position, the inner sleeve 24 may be rotated such that none of the inner openings 50 align with any outer openings 30. This non-alignment cuts off any fluid communication between the fluid in the interior of the vessel V and internal cavity of the inner sleeve 24. A device D inserted into the internal cavity of the inner sleeve 24 may not be exposed to the fluid in the interior of the vessel V. Furthermore, in this closed position, the screw 66 may be moved to the opposite end of the outer slot 36 as the end for the open position. In one embodiment, this end of the outer slot 36 may be the circular end 38.

A potential issue with the valve 20 is air that may be trapped in the internal cavity of the inner sleeve 24 when a device D is being replaced. When a device D is removed, the internal cavity of the inner sleeve 24 may be exposed to atmosphere. As a new device D is inserted into the inner sleeve 24, some air may be trapped in the internal cavity. Subsequently, when the valve 20 is opened, the trapped air may be released to the interior of the vessel V, which may cause issues.

Figure 5:
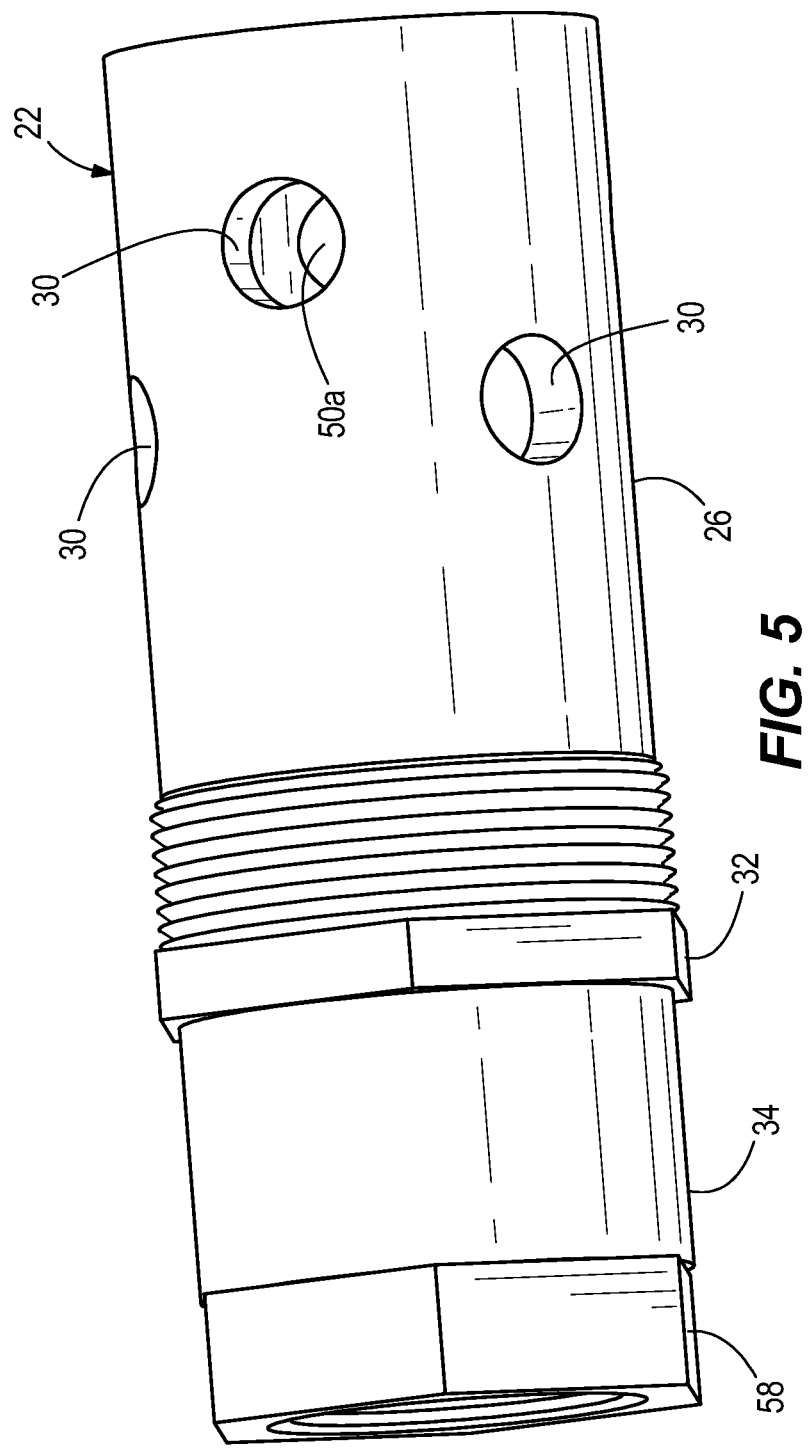
FIG. 5 is an isometric view of the valve of FIGS. 1-4, showing the valve in the purge position in which an opening in the inner sleeve is partially aligned with an opening in the outer sleeve.

The present invention may resolve this issue by incorporating provisions for purging the trapped air. The valve 20 may be rotated to the purge position by moving the screw 66 between the open and closed positions in the outer slot 36. As shown in FIG. 5, in this purge position, the inner sleeve 24 may be positioned such that the purge opening 50a may be at least partially aligned with an outer opening 30. This partial alignment may allow for the fluid in the interior of the vessel V to be in fluid communication with the internal cavity of the inner sleeve 24 through the outer opening 30 and the purge opening 50a. Subsequently, the air path formed by the inner slot 52 and the inner channel 70 may allow for the internal cavity of the inner sleeve 24 to be in fluid communication with the traverse passage 62. When the screw 66 is sufficiently tightened in the traverse passage 62, the screw seal 68 presses against the inner body 56 and cuts off any fluid communication with the atmosphere. When purging, the screw 66 may be loosened to break the seal and continue the air path from the internal cavity of the inner sleeve 24 to the external atmosphere through the traverse passage 62. Thus, in the purge position, the fluid in the interior of the vessel V may be in fluid communication with the external atmosphere through the purge opening 50a to the inner slot 52 and inner channel 70, and through the traverse passage 62.

In the purge position, all other inner openings 50 may still be out of alignment with outer openings 30. Thus, fluid from the vessel V may enter the internal cavity of the inner sleeve 24 through the partially aligned purge opening 50a and outer opening 30 slower than when the valve 20 may be in the open position with all the inner openings 50 and outer openings 30 aligned.

When the valve 20 is in the purge position, the valve 20 fills with fluid from the vessel V, which pushes trapped air out of the valve 20 through the traverse passage 62. Ideally, the valve 20 may be installed in the vessel wall with the purge opening 50a facing at least partially downwards. Fluid from the vessel V may flow into the internal cavity of the inner sleeve 24 through the purge opening 50a and subsequently to the air path formed by the inner slot 52, inner channel 70, and traverse passage 62. As fluid fills the air path, the air trapped in the internal cavity may be pushed out of the valve 20 through the traverse passage 62.

After the majority of the air is expelled from the valve 20, fluid from the vessel V may fill most of the air path and begin to be expelled from the traverse passage 62. Then, the screw 66 may be tightened causing the screw seal 68 to cut off the air path from the internal cavity of the inner seal to exterior of the valve 20. After the trapped air is purged, the valve 20 may be moved to the open position. The tightened screw 66 may be moved to the open position in the outer slot 36.

Figure 11:
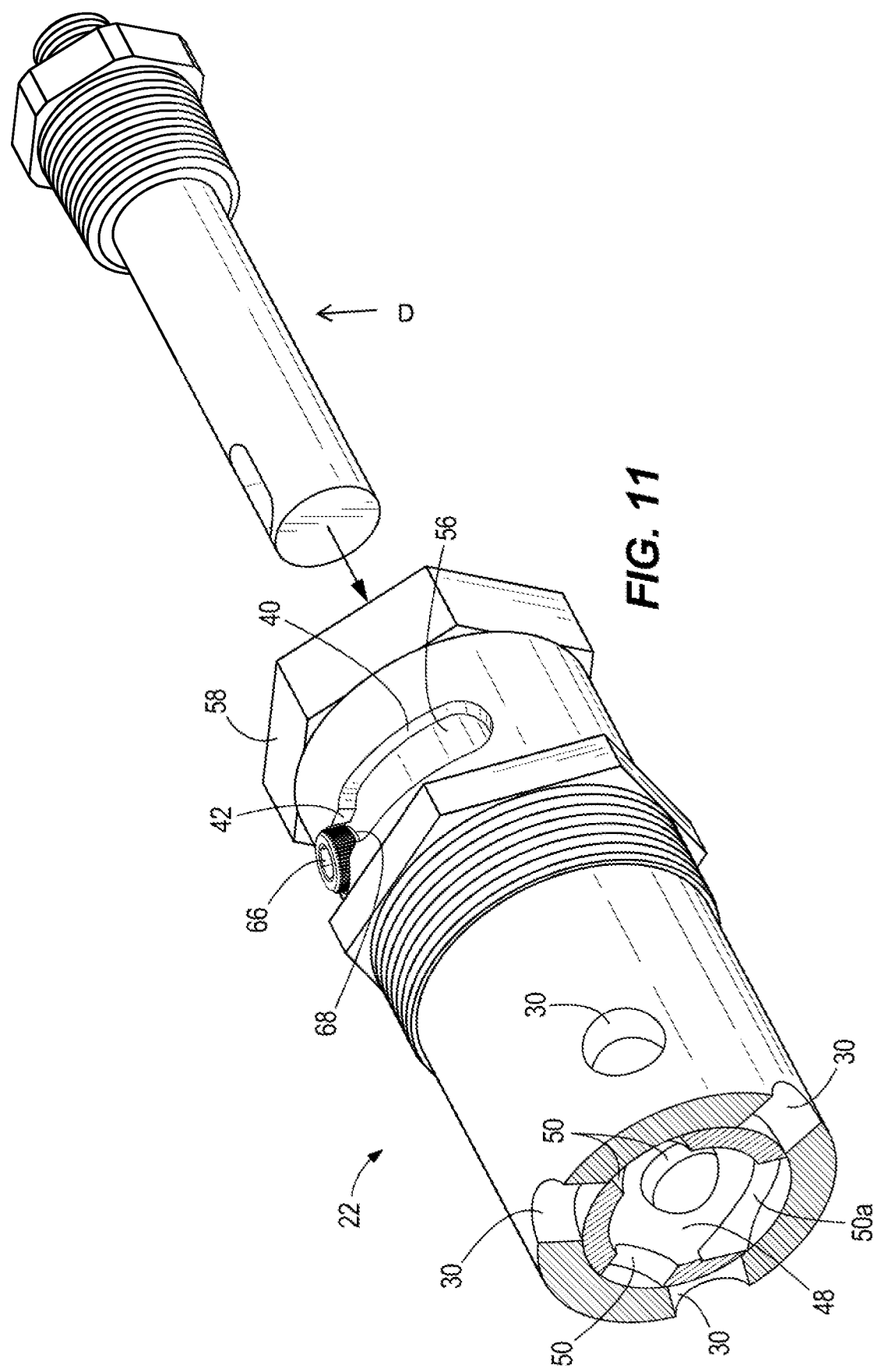
FIG. 11 is an isometric view of the valve of FIGS. 1-6, partially in section, showing the valve in the closed position for receiving a device in its interior.

FIGS. 11-15 provide cross sectional views of an embodiment of the valve 20 in the closed, purge, and open positions. FIG. 11 illustrates a device D may be inserted into the internal cavity of the inner sleeve 24. Prior to the device D being inserted, the internal cavity of the inner sleeve 24 may be exposed to atmosphere. When the device D is inserted, some air may be trapped in the internal cavity. During the installation of the device, the valve 20 may be in the closed position to prevent fluid from the vessel V from being expelled from the internal cavity of the inner sleeve 24. The valve 20 is maintained in the closed position by the head of the screw 66 being engaged within the circular end 38 of the slot 36.

Figure 12:
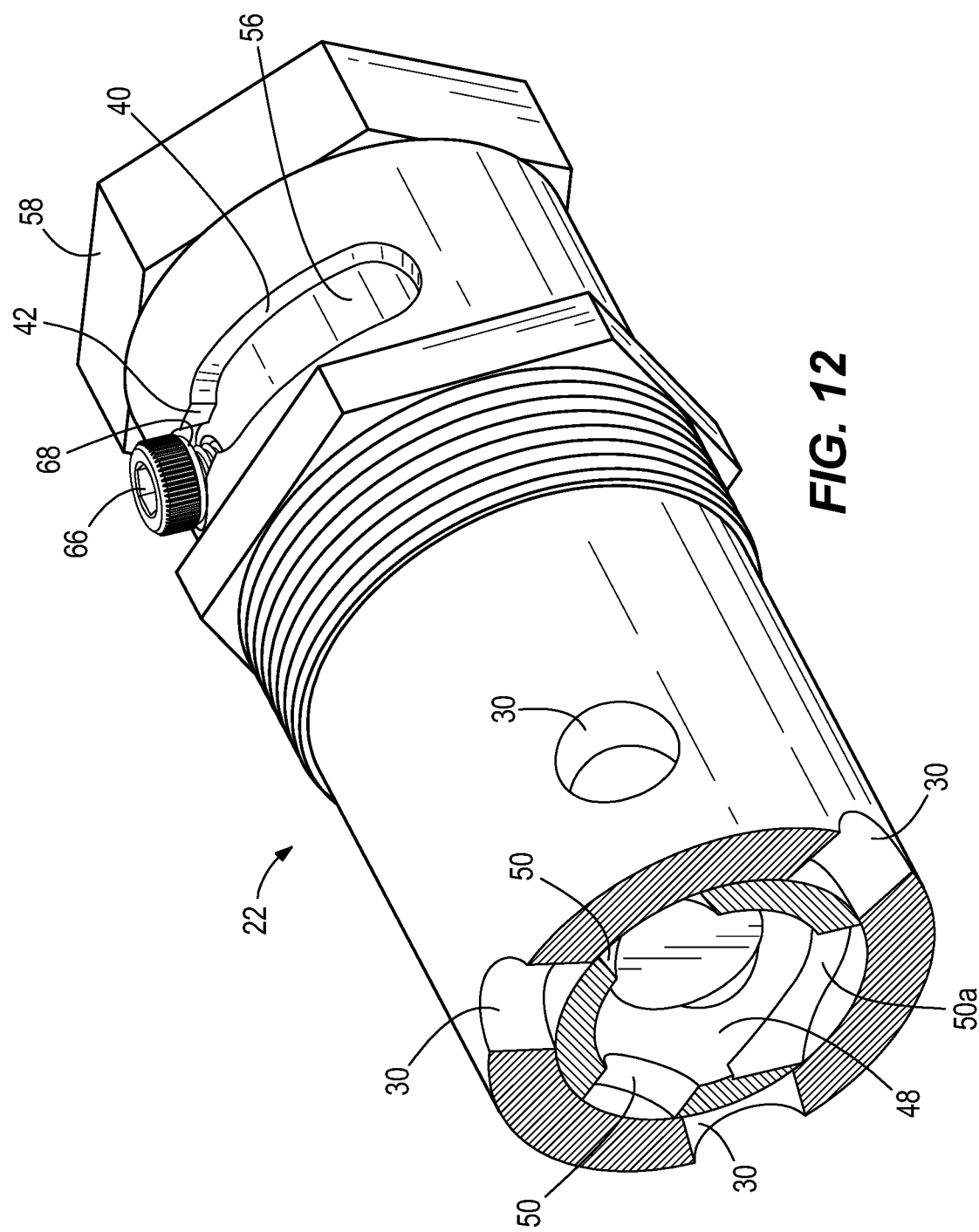
FIG. 12 is an isometric view similar to FIG. 11, showing the valve in the closed position with the device inserted into the inner sleeve.

FIG. 12 illustrates a cross-sectional view of the valve 20 in the closed position with the device D inserted into the inner sleeve 24. In this closed position, the inner sleeve 24 is rotated such that the inner openings 50 may not be aligned with the outer openings 30. The exterior of the outer sleeve 22 may be cut off from the internal cavity of the inner sleeve 24. The fluid from the interior of the vessel V may be blocked from entering the internal cavity of the inner sleeve 24 by the inner sidewall 48. As shown in FIG. 12, in anticipation of the valve 20 being moved to the purge position, the screw 66 is turned so as to position the head of the screw 66 upwardly out of engagement within the circular end 38 of the slot 36. With the screw 66 in this position, the inner sleeve 24 can be rotated relative to the outer sleeve 22 to move the valve 20 to the purge position.

Figure 13:
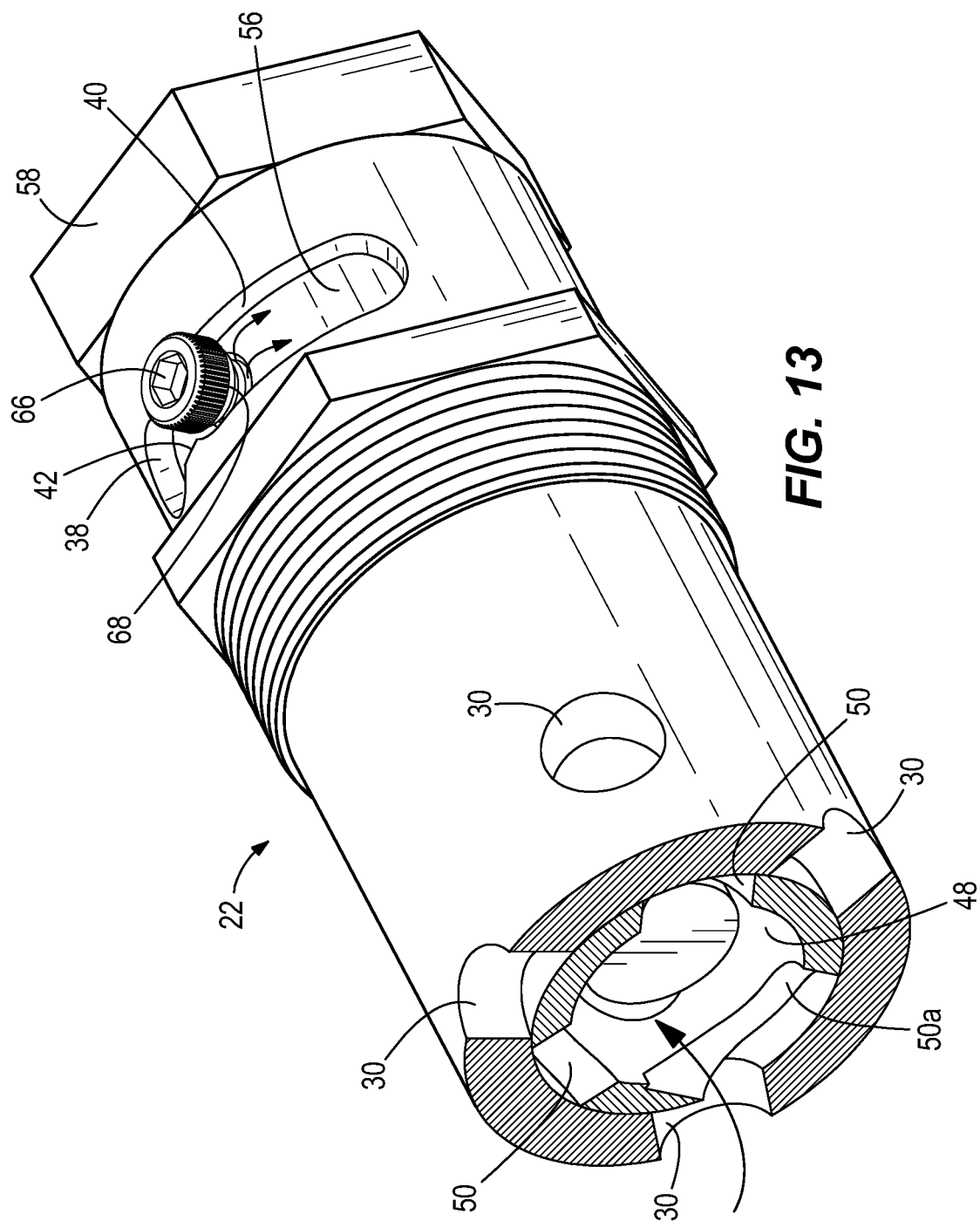
FIG. 13 is an isometric view similar to FIGS. 11-12, showing the valve in the purge position with a screw untightened.

FIG. 13 depicts the valve 20 in the purge position. As noted above, the screw 66 may be moved upwardly away from the circular end 38 and positioned between the closed position and open position in the middle of the outer slot 36. The middle of the outer slot 36 may be near the narrow neck 42 of the outer slot 36. The screw 66 may be loosened in the traverse passage 62 so that the screw seal 68 does not abut the inner body 56.

In this purge position, the purge opening 50a may be at least partially aligned with an outer opening 30, as shown in FIG. 13. However, the other inner openings 50 may not be aligned with outer openings 30. The exterior of outer sleeve 22 may be in fluid communication with the internal cavity of the inner sleeve 24 through the purge opening 50a alone. Fluid from the interior of the vessel V may enter the internal cavity only through the partially aligned purge opening 50a and outer opening 30.

The purge opening 50a may be positioned facing downward in the vessel V. Fluid in the interior of the vessel V may flow into the internal cavity of the inner sleeve 24 through the purge opening 50a. This fluid may push the trapped air in the internal cavity through the air path formed by the inner slot 52, inner channel, and traverse passage 62. As fluid from the vessel V continues to fill the valve 20, the trapped air is pushed out of the valve 20 and is expelled through the traverse passage 62. After fluid has filled the air path, the majority of the trapped air may be expelled from the valve 20. Fluid may then begin to be expelled from the traverse passage 62.

Figure 14:
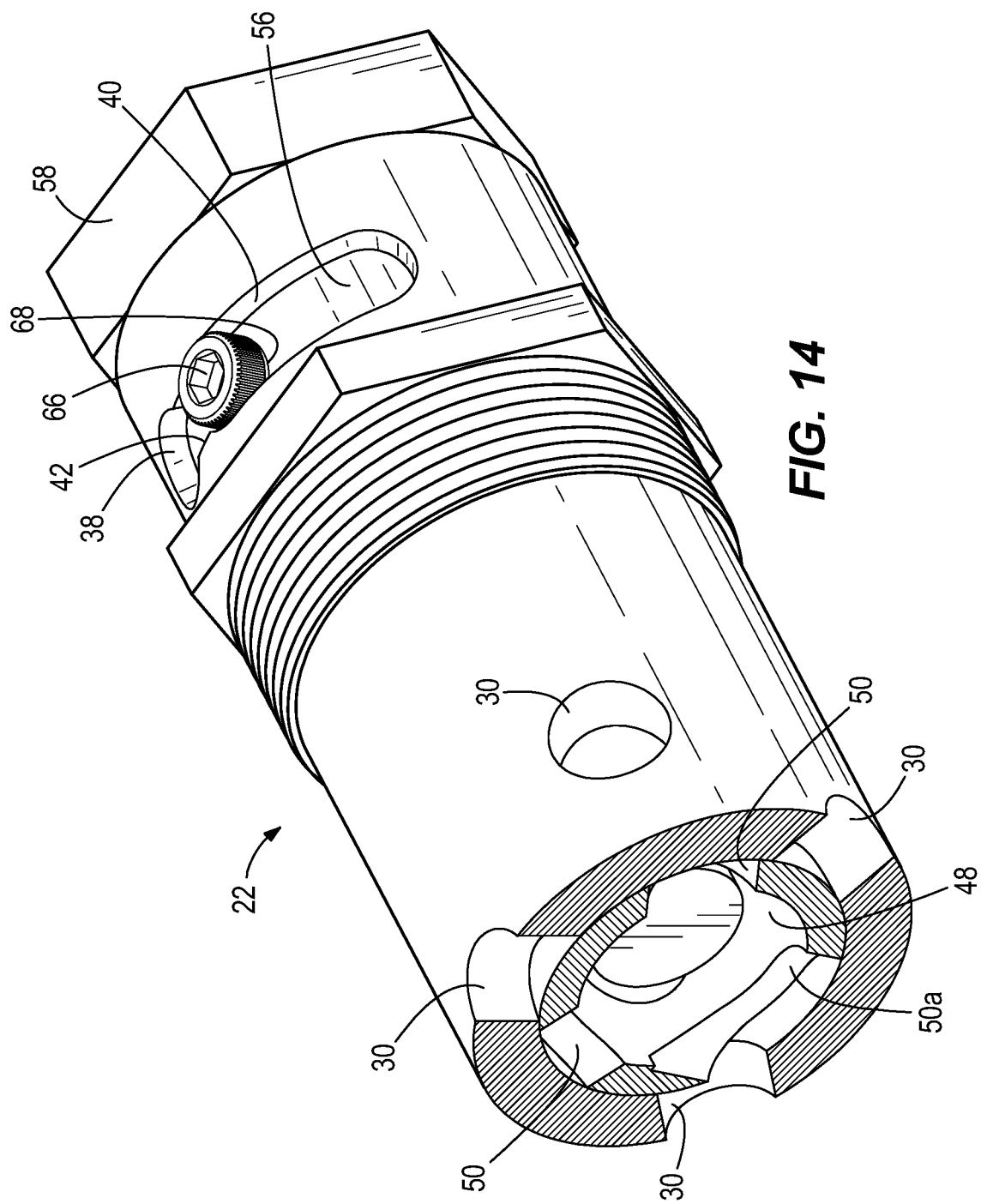
FIG. 14 is an isometric view similar to FIGS. 11-13, showing the valve in the purge position with the screw tightened.

As shown in FIG. 14, after the majority of the trapped air is expelled, the screw 66 may be tightened in the traverse passage 62. The screw 66 may be sufficiently tightened so that the screw seal 68 may abut and press against the inner body 56. The screw seal 68 may cut off the fluid communication between the interior and exterior of the traverse passage 62. This may prevent any additional fluid or trapped air from being expelled from the valve 20.

Figure 15:
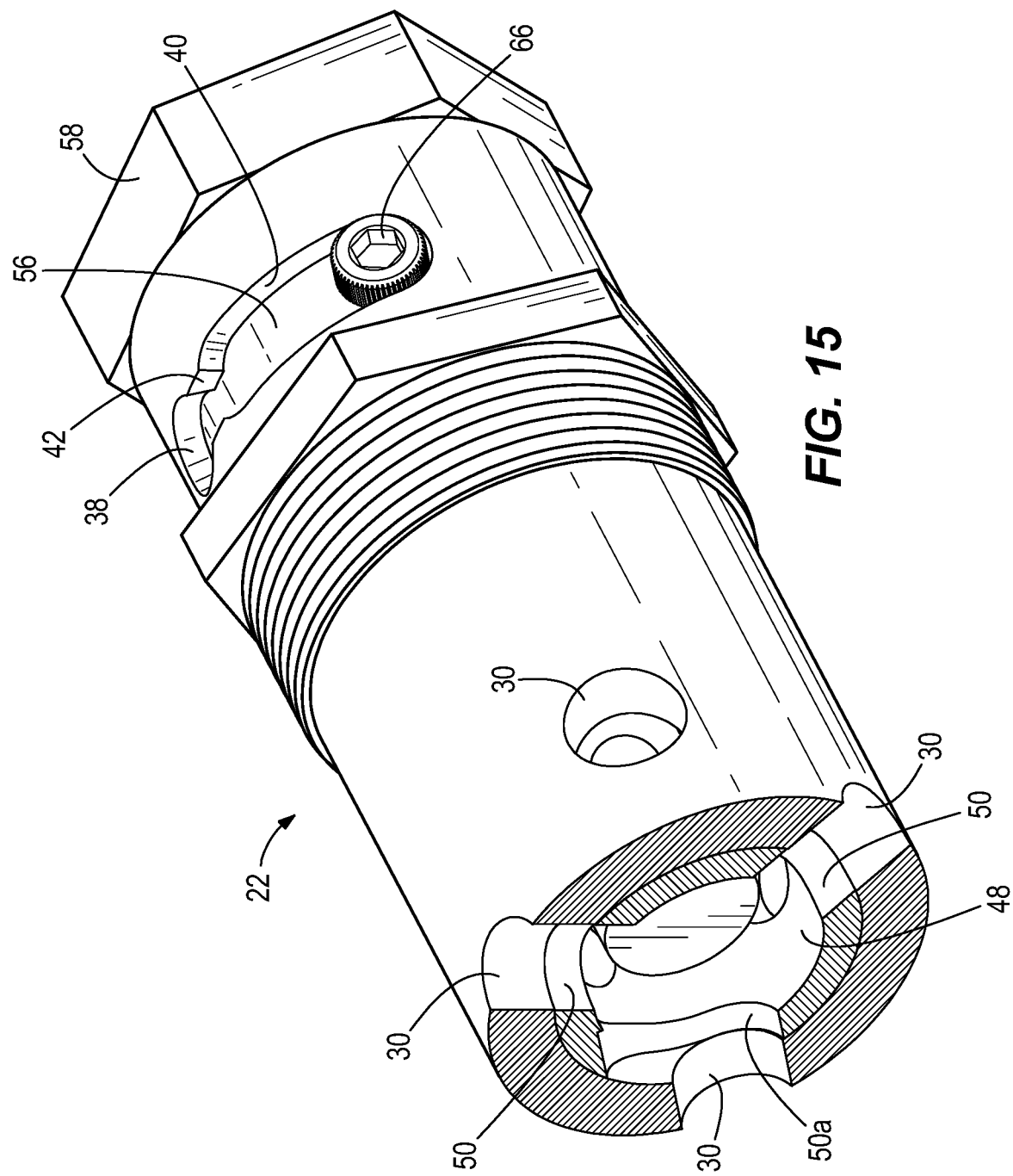
FIG. 15 is an isometric view similar to FIGS. 11-14, showing the valve in the open position.

As illustrated in FIG. 15, after the screw 66 is tightened, the valve 20 may then be turned to the open position. The screw 66 may be moved to the end of the elongated channel 40 of the outer slot 36, opposite the circular end 38. In the open position, the inner openings 50 may align with the outer openings 30. This alignment allows the exterior of the outer sidewall 26 to be in fluid communication with the internal cavity of the inner sleeve 24. Thus, the device D inserted in the inner sleeve 24 may be exposed to the fluid in the interior of the vessel V, allowing the device D to measure parameters of the fluid.

It should be understood that the invention is not limited in its application to the details of construction and arrangements of the components set forth herein. The invention is capable of other embodiments and of being practiced or carried out in various ways, and variations and modifications of the foregoing are within the scope of the present invention.

We claim:

1. A valve configured for use in combination with a vessel defining an interior, comprising: an outer sleeve configured for engagement with a wall of the vessel and to extend into the vessel interior, wherein the outer sleeve includes a wall that defines an internal cavity, wherein the wall is provided with one or more openings; an inner sleeve movably engaged with the outer sleeve and having a portion positioned within the internal cavity of the outer sleeve, wherein the inner sleeve defines an interior and includes one or more openings that establish communication between the internal cavity of the outer sleeve and an interior defined by the inner sleeve, wherein the interior defined by the inner sleeve is configured to receive a component such as a sensor, and wherein the inner sleeve further includes an external portion located externally of the vessel wall, wherein the external portion of the inner sleeve is provided with a passage that communicates between the interior of the inner sleeve and the exterior of the vessel; wherein the inner sleeve is movable relative to the outer sleeve between a closed position, wherein the openings of the inner sleeve are positioned out of alignment with the openings of the wall of the outer sleeve so as to cut off communication between the vessel interior and the interior of the inner sleeve, and a purge position at initial installation of the component or subsequent to replacement of the component, wherein communication is established between the vessel interior and the interior of the inner sleeve wherein, in the purge position, the passage in the external portion of the inner sleeve can be opened so as to enable fluid to pass from the vessel interior into and through the interior of the inner sleeve and through the passage so as to expel any air that may be contained within the internal cavity of the outer sleeve and the interior of the inner sleeve; wherein the passage and the external portion of the inner sleeve can be opened via operation of a plug member by a user to selectively move the plug member relative to the passage between a closed position and an open position.

2. The valve of claim 1, wherein the plug member comprises a screw.

3. The valve of claim 2, wherein the outer sleeve includes a collar located exteriorly of the vessel, wherein the collar includes a slot;

wherein the outer sleeve and the inner sleeve are arranged such that the screw is positioned within the slot;

wherein the screw is movable within the slot causing the inner sleeve to move relative to the outer sleeve.

4. The valve of claim 3, wherein the slot is elongated and defines a first end, a restricted middle portion and a second end opposite the first end, wherein the screw may be moved between the first end and the second end, passing through the restricted middle portion.

5. The valve of claim 4, wherein placement of the screw at the first end correlates to the closed position, placement of the screw adjacent the middle portion correlates to the purge position, and placement of the screw at the second end correlates to an open position, wherein the one or more openings of the outer sleeve are aligned with the one or more openings of the inner sleeve.

6. The valve of claim 1, wherein in the purge position a restricted path of communication is established between the vessel interior and the interior of the inner sleeve via the one or more openings of the inner sleeve and the one or more openings in the wall of the outer sleeve, and wherein the inner sleeve is further movable relative to the outer sleeve to an open position in which an enlarged path of communication is established between the vessel interior and the interior of the inner sleeve via the one or more openings of the inner sleeve and the one or more openings in the wall of the outer sleeve.

7. The valve of claim 6, wherein the outer sleeve includes multiple openings, and
the inner sleeve includes multiple openings, wherein one of the multiple openings of the inner sleeve has an irregular shape that defines an irregular shaped opening;
wherein the restricted path of communication is established via the irregular shaped opening at least partially aligning with an opening of the outer sleeve while the remaining multiple openings of the inner sleeve are not aligned with an opening of the outer sleeve.

8. The valve of claim 7, wherein the irregular shape is an elongated circle.

9. The valve of claim 1, wherein the internal sleeve includes a channel adjacent to the interior of the inner sleeve, wherein the channel defines an air path between the interior of the inner sleeve and the passage such that the channel establishes communication between the interior of the inner sleeve and the passage.

10. The valve of claim 1, wherein the outer sleeve and the inner sleeve have a cylindrical shape.

11. The valve of claim 10, wherein the internal cavity of the outer sleeve defines an interior surface of the outer sleeve, and the inner sleeve defines an exterior surface of the inner sleeve, wherein the interior surface of the outer sleeve is in close proximity to the exterior surface of the inner sleeve.

12. The valve of claim 1, wherein the inner sleeve receives the component via mating threads.

13. The valve of claim 1, wherein the inner sleeve is configured to cut off direct communication between the interior of the inner sleeve and the exterior of the vessel via the inner sleeve receiving the component.

14. A valve configured for use in combination with a vessel defining an interior, comprising: an outer sleeve configured for engagement with a wall of a vessel, wherein the outer sleeve includes a first wall that defines a first internal cavity, wherein the first wall includes one or more openings, wherein a portion of the first wall and the one or more openings of the outer sleeve extend into the interior of the vessel; an inner sleeve configured for engagement with the first internal cavity of the outer sleeve, wherein the inner sleeve includes a second wall that defines a second internal cavity, wherein the second wall includes one or more openings, wherein a portion of the second wall and the and the one or more openings of the inner sleeve extend into the first internal cavity of the outer sleeve; wherein the inner sleeve further includes a passage that establishes communication between the second internal cavity and an exterior of the vessel, wherein the passage is configured to be opened and closed; wherein the inner sleeve is moveable relative to the outer sleeve such that moving the inner sleeve changes the valve between an open position, a closed position, and a purge position; wherein, in the open position, the one or more openings of the outer sleeve are aligned with the one or more openings of the inner sleeve such that the interior of the vessel is in communication with the second internal cavity of the inner sleeve, wherein the passage is closed to cut off communication between the second internal cavity of the inner sleeve and the exterior of the vessel; wherein, in the closed position, the one or more openings of the outer sleeve are not aligned with the one or more openings of the inner sleeve such that the interior of the vessel is not in communication with the second internal cavity of the inner sleeve; and wherein in the purge position, the one or more openings of the outer sleeve are at least partially aligned with the one or more openings of the inner sleeve such that the interior of the vessel is in communication with the second internal cavity of the inner sleeve, wherein the passage is open such that the second internal cavity of the inner sleeve can be placed in communication with the exterior of the vessel via operation of a plug member by a user to selectively move the plug member relative to the passage between a closed position and an open position.

15. The valve of claim 14, wherein the inner sleeve is configured for engagement with a device, wherein a portion of the device is inserted into the second internal cavity of the inner sleeve.

16. The valve of claim 15, wherein, in the purge position, the communication between the interior of the vessel and the second internal cavity of the inner sleeve is partially restricted compared to the open position.

17. A method of installing a device in a vessel having an exterior and an interior within which a volume of fluid is contained, comprising the acts of:
providing a valve interconnected with the wall of the vessel, wherein the valve defines an internal cavity configured to receive the device, wherein the valve is configured such that the internal cavity of the valve may selectively communicate both with the interior of the vessel and with the exterior of the vessel; positioning the valve in a closed position in which communication between the internal cavity of the valve and the exterior of the vessel is established and communication between the internal cavity of the valve and the interior of the vessel is cut off; installing the device in the internal cavity of the valve while the valve is in the closed position via mating engagement structure associated with the device and with the valve, wherein installation of the device cuts off communication between the internal cavity of the valve and the exterior of the vessel; and purging the internal cavity of the valve by selectively establishing communication between the interior of the vessel and the exterior of the vessel through the valve during movement of the valve away from the closed position toward an open position, wherein in the open position the valve establishes communication between the internal cavity of the valve and the interior of the vessel and cuts off communication between the internal cavity of the valve and the exterior of the vessel.

18. The method of claim 17, further comprising acts of: positioning the valve in the open position after purging the internal cavity of the valve.

19. The method of claim 17, further comprising acts of: removing a second device from the internal cavity of the valve while the valve is in the closed position and prior to installing the device in the internal cavity of the valve.

* * * * *